US005791592A

United States Patent [19]
Nolan et al.

[11] Patent Number: 5,791,592
[45] Date of Patent: Aug. 11, 1998

[54] HELICOPTER WITH COAXIAL COUNTER-ROTATING DUAL ROTORS AND NO TAIL ROTOR

[76] Inventors: Herbert M. Nolan, 12451 Old Plank Rd.; Jack W. Nolan, 12511 Old Plank Rd., both of Jacksonville, Fla. 32220

[21] Appl. No.: 374,931

[22] Filed: Jan. 18, 1995

[51] Int. Cl.$^6$ .................................................. B64C 27/10
[52] U.S. Cl. .................... 244/17.11; 244/17.19; 244/87; 416/170 R; 416/129
[58] Field of Search ............... 244/17.11, 17.19, 244/17.23, 87, 60; 74/421 R, 412 R, 665 S, 665 K; 416/129, 170 R

[56] References Cited

U.S. PATENT DOCUMENTS

| | | |
|---|---|---|
| 1,378,112 | 5/1921 | Hewitt ................................ 244/17.19 |
| 1,568,765 | 1/1926 | Ortego ............................... 244/17.19 |
| 1,849,235 | 3/1932 | Kibbe ................................ 244/17.19 |
| 1,887,429 | 11/1932 | Price ..................................... 416/129 |
| 2,074,342 | 3/1937 | Platt .................................. 244/17.19 |
| 2,388,653 | 11/1945 | Hays .................................. 244/17.19 |
| 2,395,610 | 2/1946 | Cavallaro ............................ 74/665 K |
| 2,480,806 | 8/1949 | Desmoulins ........................... 416/129 |
| 2,496,857 | 2/1950 | Cronstedt ............................ 74/665 K |
| 3,096,953 | 7/1963 | Koump .............................. 244/17.19 |

*Primary Examiner*—Galen L. Barefoot
*Attorney, Agent, or Firm*—Arthur G. Yeager

[57] ABSTRACT

A helicopter having two engines driving a single rotating drive shaft on which are mounted two spaced counter-rotating coaxial rotors at the same speed and having a tail boom free of a tail rotor and supporting two horizontally spaced pairs of air foils for controlling the direction of yaw in flight.

20 Claims, 5 Drawing Sheets

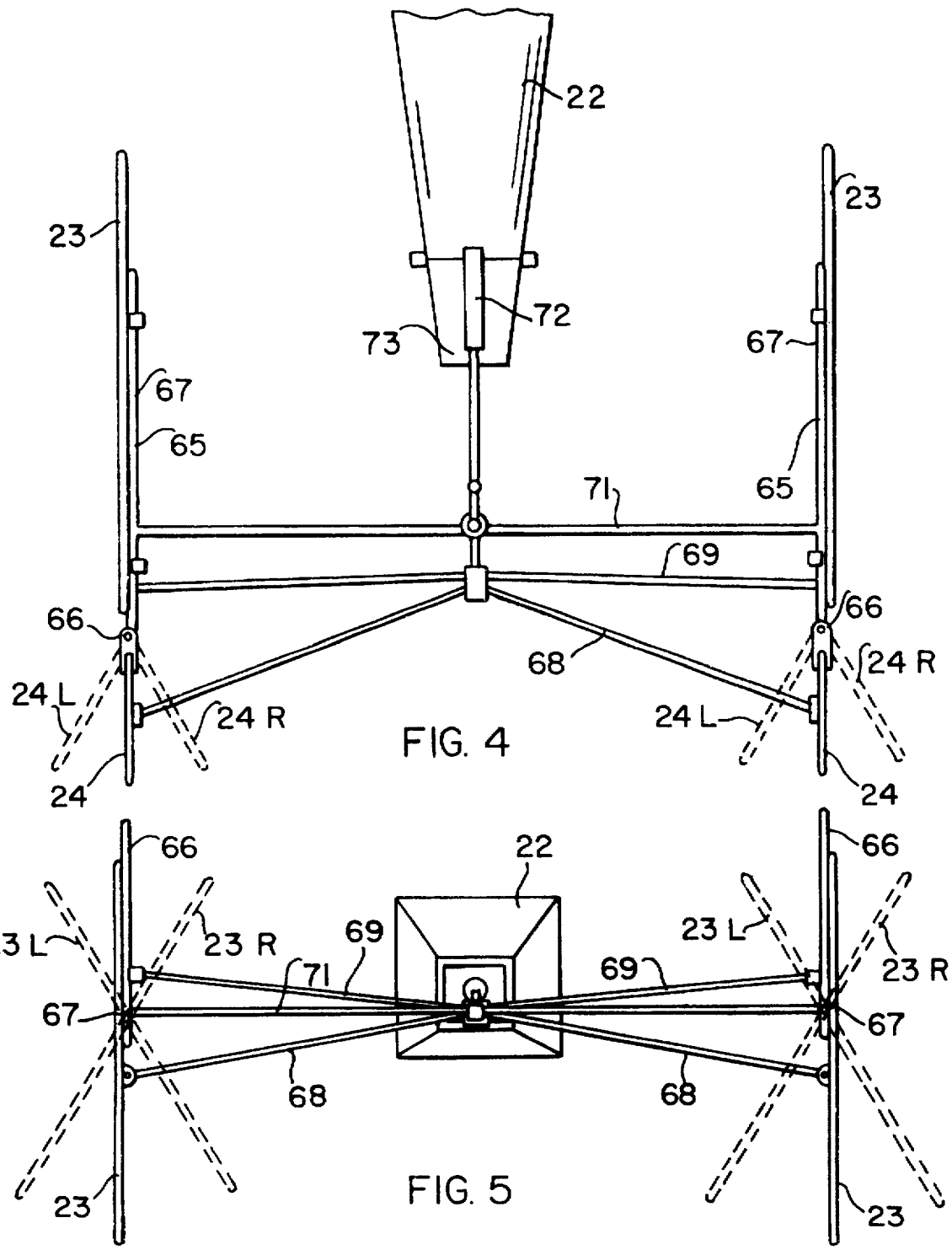

HELICOPTER WITH COAXIAL COUNTER-ROTATING DUAL ROTORS AND NO TAIL ROTOR

FIELD OF THE INVENTION

This invention relates to the field of aircraft, especially helicopters.

BACKGROUND OF THE INVENTION

Helicopters have been known for more than sixty years but have only in the last twenty-five years become of any real value in military usage, police assistance, and rescue activities. It was quickly learned that the actions of and reactions to the forces of an overhead rotating rotor caused the body of the helicopter to rotate about the shaft driving the rotor and this problem was solved by mounting a vertical rotor at the distal end of the tail to produce a force to counteract the spinning of the body.

Many attempts have been made to employ dual rotors but none has been successful commercially without the assistance of a tail rotor to stabilize the machine and to prevent spinning of the body.

It is an object of this invention to provide a helicopter with a dual coaxial rotor system with counter-rotating rotors and no tail rotor. It is another object of the invention to provide a helicopter with no tail rotor but with rear airfoils for directional control. Still other objects will become apparent from the more detailed description which follows.

BRIEF SUMMARY OF THE INVENTION

This invention relates to a helicopter having two counter-rotating horizontal rotors spaced apart vertically above the helicopter body and having a tail boom extending aft of the helicopter body to support at its distal end two pairs of air foils pivotable respectively about a horizontal axis and a vertical axis to provide directional control of the helicopter. No tail rotor is employed on this helicopter.

In specific and preferred embodiments of the invention the two rotors are fixed as to the angle of the leading edge, and operate at identical rotational speeds. The rotors are rotated by a single vertical shaft and a gear transmission that includes a planetary gear system.

The tail fin assembly includes a pair of larger vertical air foils adapted to be pivoted about horizontal axes; and a pair of smaller vertical air foils adapted to be pivoted about vertical axes.

BRIEF DESCRIPTION OF THE DRAWINGS

The novel features believed to be characteristic of this invention are et forth with particularity in the appended claims. The invention itself, however, both as to its organization and method of operation, together with further objects and advantages thereof, may best be understood by reference to the following description taken in connection with the accompanying drawings in which:

FIG. 4 is a top plan view of the air foil assembly on the tail boom of the helicopter;

FIG. 5 is a rear elevational view of the air foil assembly on the tail boom of the helicopter;

DETAILED DESCRIPTION OF THE INVENTION

The various features of this invention are best understood by reference to the attached drawing.

Figure 1:
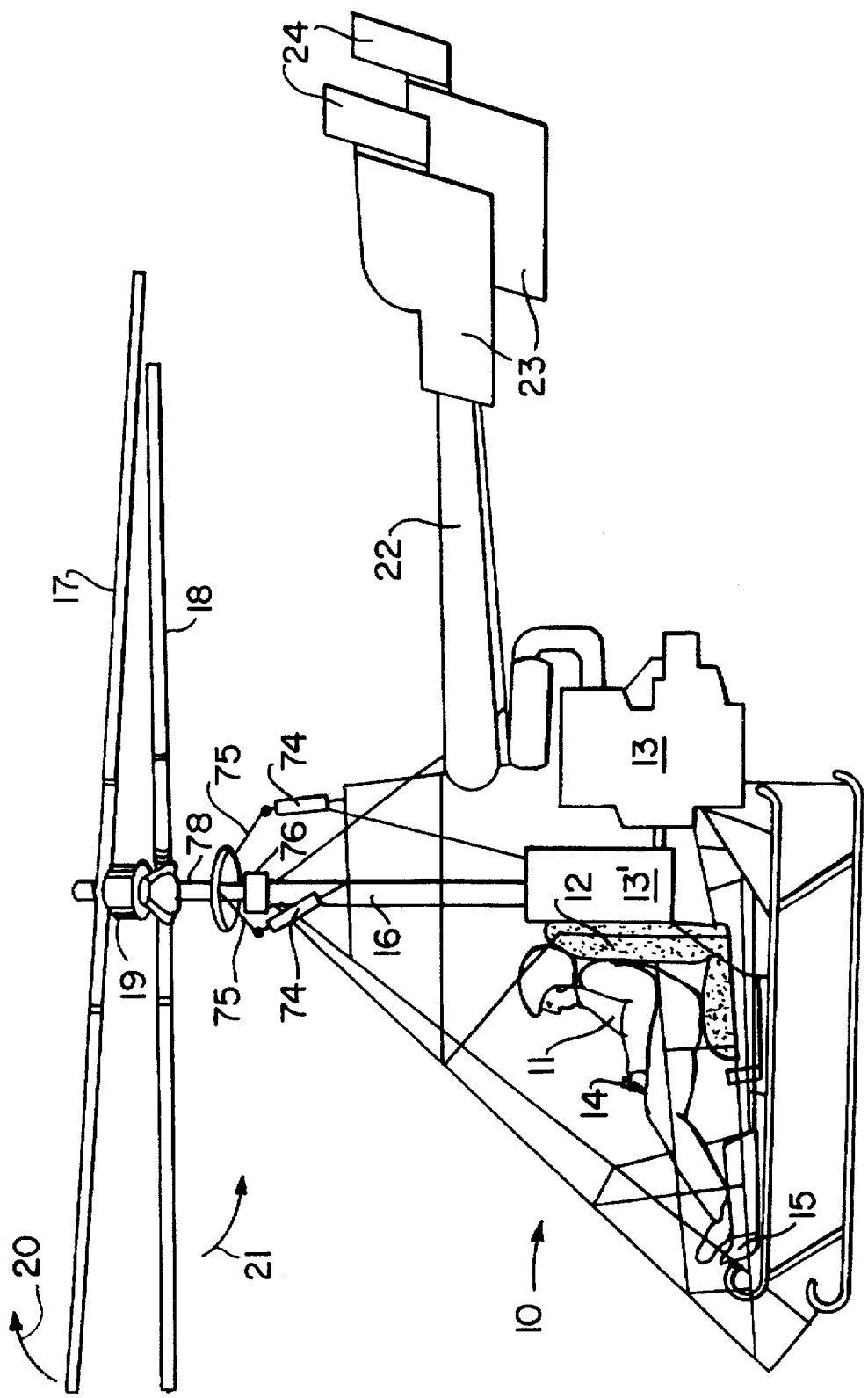
FIG. 1 is a perspective schematic view of the helicopter of this invention.

In FIG. 1 there is a perspective view of what the helicopter looks like in flight. The helicopter 10 is an open structure of steel tubing holding the necessary components together in a rigid arrangement. A pilot 11 sits in a seat 12 and rests his feet on a floor board 15 which supports control pedals for operation by the pilot's feet A control stick 14 projects upwardly between the pilot's legs and is conveniently reached by the pilot's hands. The helicopter may have skids (as shown here) or wheels, or other ground contact. A tail boom 22 extends to the rear of the helicopter and supports a pair of large air foils 23 which pivot about horizontal axes generally parallel to the tail boom 22; and a pair of small air foils 24 which pivot about vertical axes generally perpendicular to the horizontal axes.

The two rotors 17 and 18 rotate in opposite directions as shown by arrows 20 and 21 and are driven from a common vertical shaft 16, which in turn is driven by motor means 13. Preferably, there are two separate internal combustion engines, supplied by gasoline via tanks 13', both engines being connected to shaft 16 by clutches which can be separately operated to connect either engines to shaft 16. Rotors 17 and 18 are preferably substantially the same length (about 10–18 feet) and same size and shape. The two rotors have an identical unchangeable or fixed pitch. There is a CV joint 76 to provide an upper tiltable portion to main shaft 16. Transmission 19 is mounted on tiltable portion 78, as are rotors 17 and 18. Tiltable portion 78 is necessary to tilt rotors so as to direct the movement of the helicopter in its flight.

Arms 75 connect tiltable portion 78 to hydraulic cylinders 74 for the force to tilt rotors 17 and 18 to the desired position.

Figure 2:
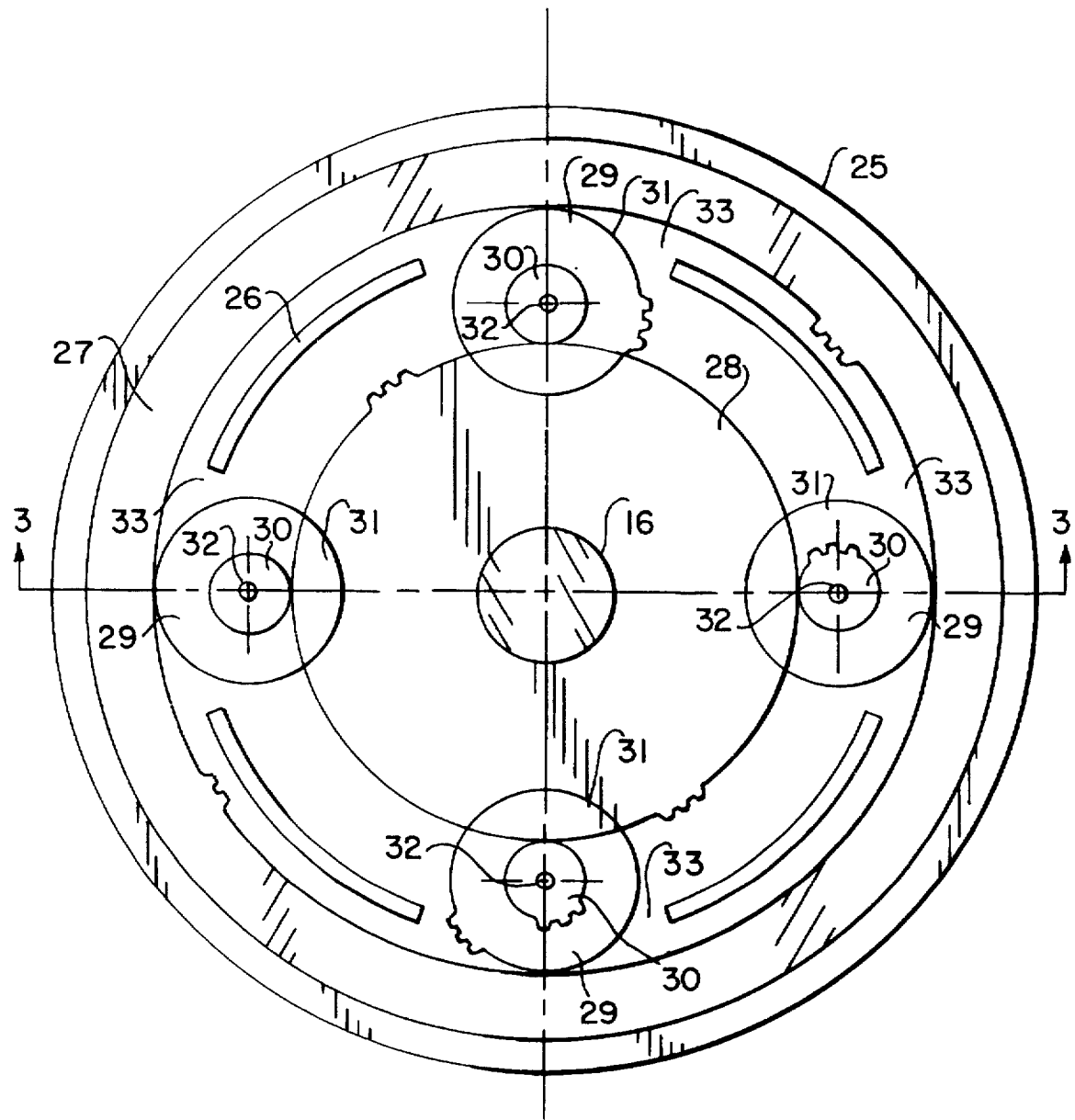
FIG. 2 is a cross-sectional view of the gear transmission at 2—2 of FIG. 3.

In FIG. 2 there is shown the arrangement of gears in transmission 19. An external lousing 25 encloses the transmission gears. An internal housing 26 supports some of these gears. External housing 25 is rigidly connected to lower rotor 18 and turns with the rotation of that rotor. Internal housing 26 is stationary and external housing 25 rotates opposite to shaft 36 as will be seen from the following description of the gear trains in the transmission.

Around the inside wall of external housing 25 is mounted a circumferential gear rack 27. A plurality, preferably four, compound planetary gears 29 are meshed with gear rack 27. "Compound gears" in this patent application means two gears mounted coaxially on a single spindle such that both gears turn in the same direction at the same speed. Compound gears 29 in this invention comprise a lower larger gear 31 and an upper smaller gear 30 mounted on a spindle 32. Larger gears 31 are meshed with gear rack 27. Shaft 16 (in tiltable portion 78) is positioned in the center of external housing 25 and internal housing 26 extending perpendicularly upward and downward from the plane of the drawing of FIG. 2. Large driving gear 28 is rigidly attached to shaft 16, turning with the rotation of shaft 16. Drive gear 28 is meshed with the smaller upper gears 30 of compound gears 29. It may be seen by tracing he directions of movement of gears 28, 29, 30 and 32 from either selected direction of rotation of shaft 16, that shaft 16 and external housing 25 always rotate in opposite directions. Thus, when upper propeller 17 is fastened to shaft 16 and lower rotor 18 is fastened to external housing 25 the two propellers will rotate in opposite directions and will be coaxial since both are centered on shaft 16. By appropriate choice of the number of gear teeth an the size of gears 28, 30, 31 and of gear rack 27, the rotational steed of the two propellers 17 and 18 can be made the same, as is the preferred operation of this invention. It should be noted that internal housing 26 must have some gaps 33 in its side walls to permit lower large gears 31 to be spindled in internal housing 26 and also to be meshed with gear rack 27. External housing 25 is a tightly sealed enclosure around internal housing 26 and all of the gears and thereby is generally filled with oil so as to lubricate all internal moving gears, spindles, bearings, etc.

Figure 3:
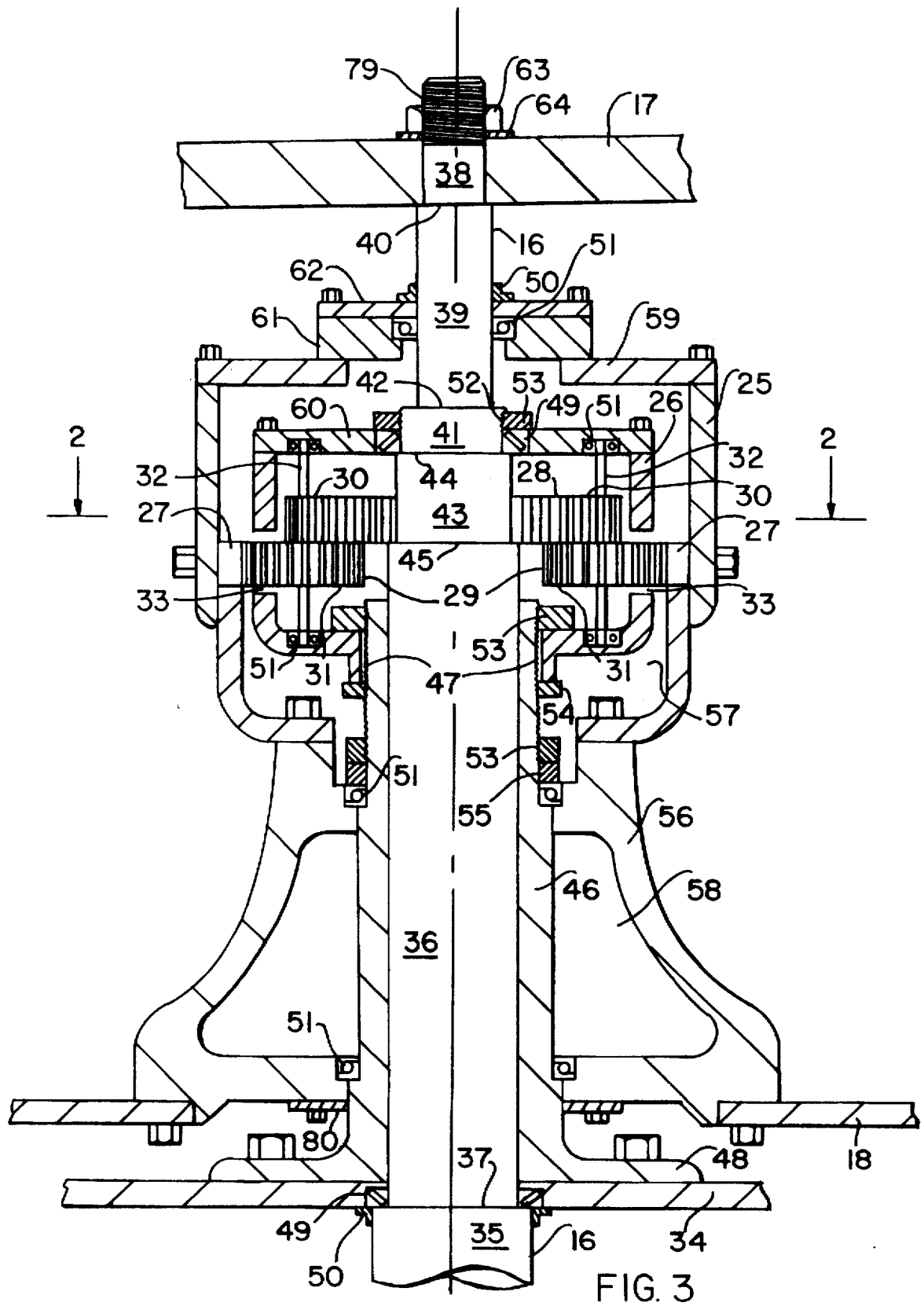
FIG. 3 is a vertical cross-section through the propellers and gear transmission of the invention.

In FIG. 3 there is shown a vertical cross section through the transmission 19 and all other components between the two propellers 17 and 18. The central power component is shaft 16 which is machined with step ledges to accept bearings, gears, or other parts. There are five step ledges where the diameter of shaft 16 changes to provide a ledge for mounting components onto shaft 16. Beginning at the top of shaft 16 in FIG. 3 and moving downward there is step ledge 40 to provide a seat for mounting upper propeller 17 and fasten it rigidly to shaft 16 so as to rotate with shaft 16. A washer 64 and nut 63 are shown to engage screw threads 79 so as to clamp propeller 17 to shaft 16. A second step is at 42 to provide a ledge with screw threads 52 to receive clamp nut 53 to force the top plate 59 of internal housing 26 and upper thrust bearing 49 against third step ledge 44. Fourth step ledge 45 provides a seat for large driving gear 28 to be mounted rigidly on shaft 16 to rotate with shaft 16. A fifth step ledge 37 is the lowest of the step ledges and it provides a seat for lower thrust bearing 49 in an appropriate supporting beam 34 of the framework of the body of helicopter 10. The main bearing surface of shaft 16 is between step ledges 37 and 44. For substantially all of this length shaft 16 is enclosed in a support sleeve 46 which is immovable and is rigidly bolted or otherwise fastened to the body of helicopter 10.

Sleeve 46 supports lower propeller 18, external housing 25, and spacer support 56, all of which rotate with propeller 18. Bearings 51 in seats on the outer surface of sleeve 46 permit propeller 18 and its attachments to rotate around sleeve 46, while shaft 16 rotates within sleeve 46. The upper end of sleeve 46 is threaded on its outside surface at 47. Upper clamp nut 53 is threaded onto threaded portion 47 and bears against internal housing 26 to clamp the housing 26 tightly against lower clamp nut 53 which provides a lower seat for housing 26 and positions its gears accurately. Lower clamp nut 53 bears against washer 55 and bearing 51. The entire inner hollows of external housing 25 and support spacer 56 are filled with oil to provide lubrication of all interior parts. Oil seals 50 and 80 provide appropriate sealing to prevent oil leakage.

At the upper portion of external housing 25 there is a hub structure of block 62, cover 62, bearing 51, and oil seal 50 around shaft 16. This structure may take on various shapes and or sizes. It merely closes the top of external housing 25 while providing an access way into the interior, and also provides a seat for bearing 51.

The remaining FIGS. 4–8 show the structure and operation of the rudder means which direct the helicopter in its flight. The structure consists of a tail boom 22 extending from the aft portion of the helicopter body to support two pairs of air foils 23 and 24. Air foils 23 are intended to react to the downward flow of air from rotors 17 and 18. The air directed against air foils 23 will cause the tail boom 22 to swing right or left, and thus pointing the nose of the helicopter in the direction desired by the pilot. Air foils 24 function similarly to the tail of an airplane in that air flowing along the length of the airplane is directed against the tail surface to swing the tail right or left. Thus the combination of forces on air foils 23 and 24 direct the helicopter of this invention as the pilot wishes. The pilot, of course, operates controls to move air foils 23 and/or 24 as desired.

The general structure of this tail assembly includes a horizontal rod 71 which supports an L-shaped pivot shaft 65 at each end of rod 71. Each shaft 65 supports one air foil 23 and one air foil 24 such that the result is a pair of widely spaced air foils 23 and a pair of widely spaced air foils 24 are available to control the direction of flight. Suitable tie rods 68 and 69 connect air foils 23 and 24 to a central control lever 70. The tie rods 68 and 69 assure that both air foils 23 move identically at the same time; and both air foils 24 move identically and at the same time. Control lever 70 is moved by the pilot as he steers the helicopter. The control means includes a single hydraulic cylinder 72 at the distal end 73 of tail boom 22 to simultaneously move all air foils.

Figure 6:
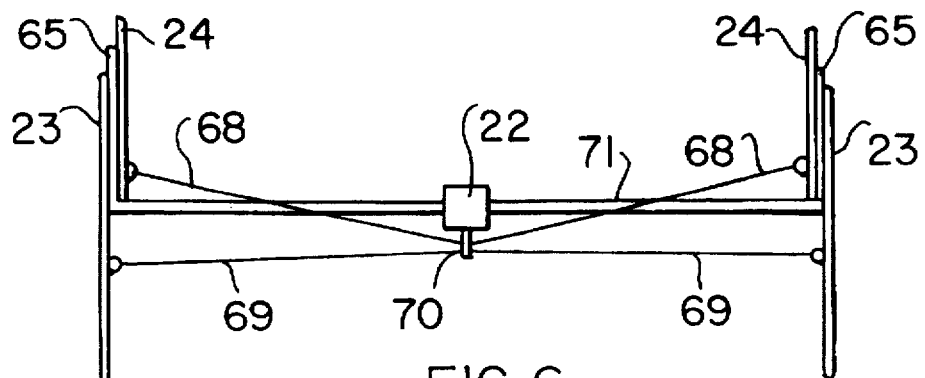
FIG. 6 is rear elevational view of the air foil assembly on the tail boom in straight vertical or horizontal flight.
Figure 7:
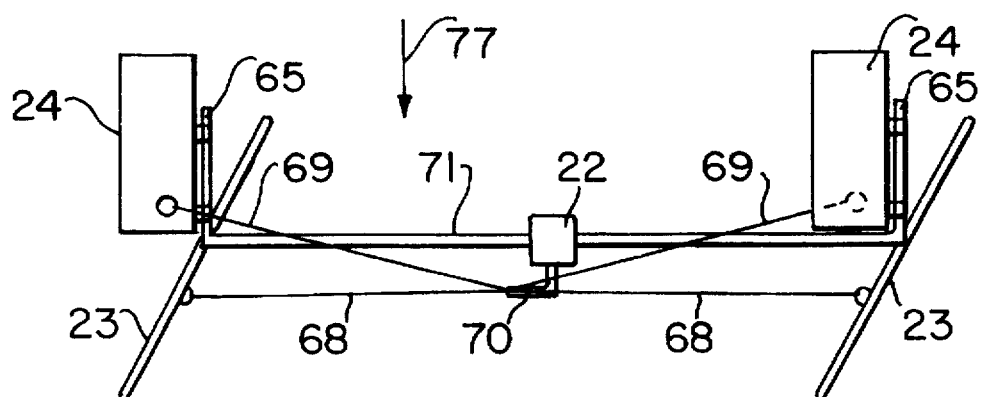
FIG. 7 is a rear elevational view of the air foil assembly on the tail boom in a left turn.
Figure 8:
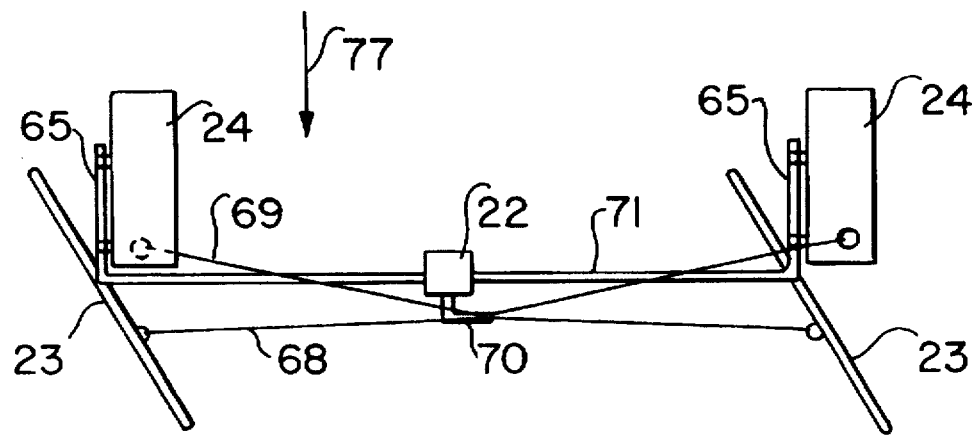
FIG. 8 is rear elevational view of the air foil assembly on the tail boom in a right turn.

The movement of air foils 23 and 24 is shown in FIGS. 4 and 5 in dotted lines where 23R and 24R represent the extreme right hand limit of movement; and 23L and 24L show the extreme left hand limit of movement of each air foil. In FIG. 6 the position of air foils 23 and 24 is shown for upward, downward, and straight forward flight of the helicopter. In FIG. 7 the positions of air foils 23 and 24 are shown (looking from behind the helicopter) which will cause the tail to swing to the right, producing a turn to the left. In FIG. 8 the positions of the air foils 23 and 24 will cause the tail to swing to the left, producing a turn to the right. These effects of forcing the tail right or left are sometimes referred to as a yaw to the right or left.

The structure of pivot shafts 65 includes a long horizontal leg 67 and a short vertical leg 66. A more precise description of horizontal leg 67 is that it is parallel to the axis of tail boom 22. Similarly a more, precise description of vertical leg 66 is that it is perpendicular to horizontal leg 67 and lies in a plane that is parallel to the axis of tail boom 22 and includes horizontal leg 67. It is realized that the terms "horizontal" and "vertical" must take into account the earth; and that the helicopter is in different positions when flying. Nevertheless, horizontal and vertical are used here to generally represent the condition when the helicopter is resting upright on the ground.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by letters patent of the united states is:

1. A helicopter having a body with a cockpit and with top, bottom, fore and aft body portions; a motor; a vertical shaft rotated by the motor and drivingly connected to two vertically spaced substantially horizontal, coaxial parallel rotor blades rotating in opposite directions with respect to each other, and at the same rotational speed; a tail boom structure extending, horizontally rearward from a proximal end at said aft body portion to a distal end where two pairs of spaced, pivotable air foils are positioned to provide the sole directional control of said helicopter, a first of said pairs being positioned to pivot respectively about two spaced, parallel horizontal shafts extending rearwardly from said distal end and a second of said pairs being positioned to pivot respectively on two vertical shafts positioned rearwardly adjacent to said first pair; said two horizontal shafts having respective axes respectively intersecting respective axes of said two vertical shafts, each said pairs of air foils being operatively connected to lever means in said cockpit, respective said air foil of each said pairs being interconnected such that said air foils of each said pairs move identically with movement of said lever means.

2. The helicopter of claim 1 wherein said vertical shaft is directly connected to an upper rotor of said two rotors and indirectly connected to a lower rotor of said two rotors through a gear train.

3. The helicopter of claim 2 wherein said gear train includes an internal housing enclosed by an external housing, both said housings being positioned concentrically about said vertical shaft and concentric with respect to each other; said external housing being immovably fastened to said lower rotor and said internal housing being rigidly fastened to said helicopter body; said external housing having mounted interiorly thereon a circumferential gear rack and said internal housing having mounted therein a plurality of compound gears, each having a larger gear and a smaller gear, said larger gear being meshed with said gear rack, one large driving gear mounted rigidly on said vertical shaft and inside said internal housing and meshed with said smaller gears of said compound gears.

4. The helicopter of claim 3 wherein said compound gears are all identical, each including a central vertical spindle to which are rigidly fastened a vertically lower, large diameter horizontal spur gear and a vertically higher, small diameter horizontal spur gear, said spindles being totally journaled in said internal housing.

5. The helicopter of claim 3 wherein said vertical shaft is journaled inside an elongated sleeve rigidly fastened to said helicopter body and extending vertically upwardly to an upper end in the interior of said internal housing, said internal housing being rigidly attached to said upper end of said sleeve by screw thread connection.

6. The helicopter of claim 5 wherein said external housing is spaced upwardly from said lower rotor and supported on a hollow spacer support fastened at its lower surface to said lower propeller, said hollow being adopted to contain a supply of lubricant for lubricating the contiguous surfaces of said spacer support and said elongated sleeve.

7. The helicopter of claim 5 wherein said upper end of said sleeve is externally threaded to receive a clamping nut to join said spacer support to said sleeve, to receive a stop nut for supporting and positioning said internal housing, and to receive a clamping nut to clamp said internal housing against said stop nut.

8. The helicopter of claim 3 wherein said external housing is sealed and journaled to contain a supply of lubricant to lubricate the contiguous surfaces of said vertical shaft and said external housing as well as the meshing surfaces of all gears therein.

9. The helicopter of claim 1 wherein said tail boom structure is rigidly attached to said helicopter body at said aft portion.

10. The helicopter of claim 9 further comprising a hydraulic cylinder controlled by said lever means for controlling movement of each of said first and second pairs of air foils simultaneously.

11. The helicopter of claim 9 wherein said tail boom structure comprises an elongated slender framework having at its distal end two horizontally spaced L-shaped pivot shafts oriented with one leg of said L being parallel to said tail boom and the other leg of said L being perpendicular to said tail boom, both said legs of each said L-shaped pivot shaft lying in a vertical plane; said first pair of identical air foils being pivotably attached respectively to said one leg, and said second pair of identical air foils being pivotably attached respectively to said other leg.

12. The helicopter of claim 11 wherein said first pair of air fails are relatively large in surface area and said second pair of air foils are relatively small in surface area.

13. A gear train assembly for driving two vertically spaced rotors of a helicopter in opposite rotational directions while being mounted on a single drive shaft, comprising a vertical drive shaft rotatably driven from a motor means, said shaft having a plurality of concentric diameters separated by a plurality of step ledges with the largest diameter being attached to said motor means and the smallest diameter being attached to the upper of said rotors and the next-to-the-largest diameter being attached to the lower of said rotors said lower rotor having rigidly attached thereto an enclosure concentric about said drive shaft and extending upwardly to adjacent said upper rotor and adapted to contain gears, bearings, and lubricant therefor; and an elongated vertical sleeve rigidly attached to said helicopter and journaling said drive shaft through substantially all of its length embodying the next-to-largest diameter; said enclosure including a spacer support rigidly attached to said lower propeller and extending upwardly to, and rigidly attached to an external housing enclosing an internal housing, said internal housing enclosing a horizontal driving gear rigidly attached to said vertical shaft and meshed with a plurality of compound gears, each said compound gears comprising an upper small diameter horizontal spur gear rigidly attached to a lower large diameter horizontal spur gear, each compound gear being mounted on a vertical spindle journaled at each end in said internal housing; said external housing having an inside surface upon which is rigidly attached a circumferential gear rack meshed with each said lower large diameter horizontal spur gear of said compound gears.

14. The assembly of claim 13 wherein said internal housing is stationary and said external housing rotates with said lower rotor.

15. The assembly of claim 13 wherein said internal housing is attached to and supported by said elongated vertical sleeve through a screw thread connection.

16. The assembly of claim 13 wherein one of each of said spur gears and respective said vertical spindle are unitary.

17. The assembly of claim 13 further comprising a helicopter tail boom assembly having means for controlling the direction of yaw in flight, said means for controlling including at least one pair of spaced air foils.

18. A tail fin assembly for use in controlling the direction of flight of a helicopter, which comprises an elongated slender boom structure attachable to the aft portion of said helicopter below the level of the helicopter propellers, said boom structure having a distal end portion which supports two horizontally spaced L-shaped pivot shafts, each L-shaped pivot shaft having a first leg parallel to said boom structure; each said pivot shaft pivotably supporting a larger air foil on said first leg and a smaller air foil on said second leg, first tie rods joining said two larger air foils and, second tie rods joining said two smaller air foils, and control means extending from said helicopter to said first and second tie rods for moving said two larger air foils and said two smaller air foils.

19. The assembly of claim 18 wherein said control means includes a single hydraulic cylinder for simultaneously moving all of said air foils.

20. The assembly of claim 18 further comprising a pair of vertically spaced substantially horizontal, coaxial parallel rotor blades rotating in opposite relative directions and at the same rotational speed.

* * * * *